K. BECKMANN.
MANURE DRILL.
APPLICATION FILED FEB. 28, 1910.

975,111.

Patented Nov. 8, 1910.
2 SHEETS—SHEET 1.

Witnesses

Inventor

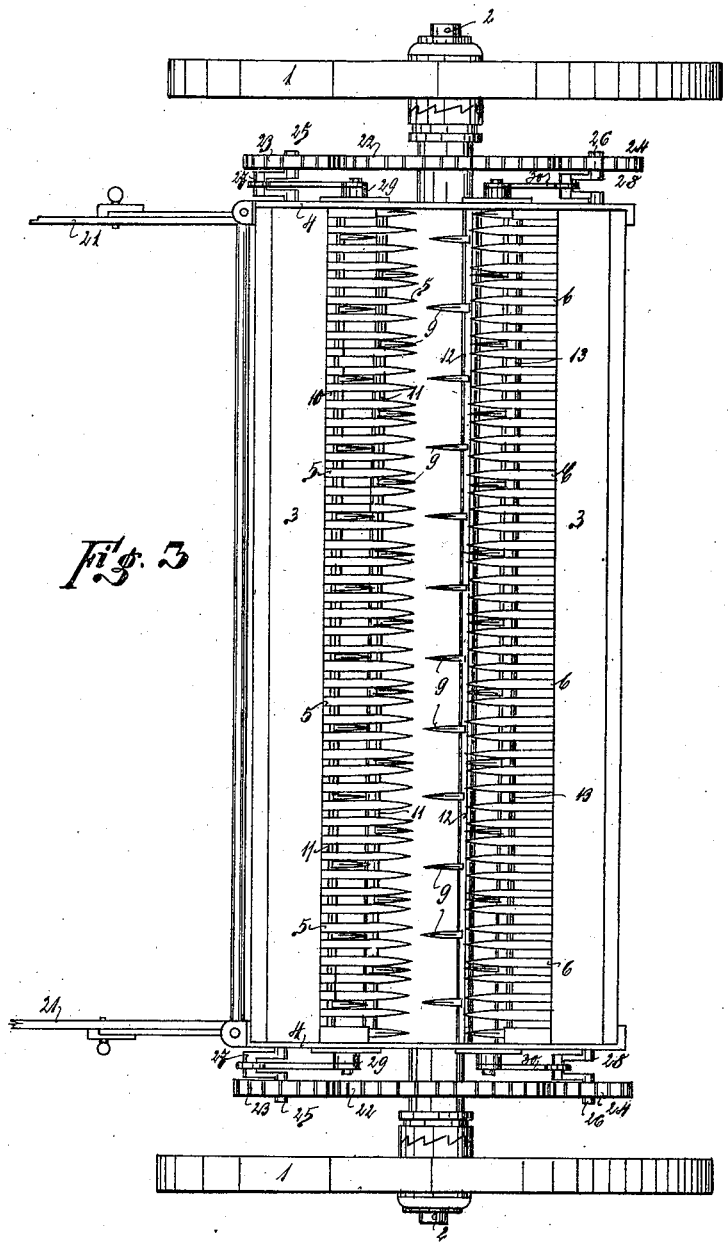

UNITED STATES PATENT OFFICE.

KARL BECKMANN, OF SCHWERIN, GERMANY.

MANURE-DRILL.

975,111.  Specification of Letters Patent.  Patented Nov. 8, 1910.

Application filed February 28, 1910. Serial No. 546,359.

*To all whom it may concern:*

Be it known that I, KARL BECKMANN, a subject of the Grand Duke of Mecklenburg, and residing at Schwerin, Grand Duchy of Mecklenburg, Germany, have invented certain new and useful Improvements in Manure-Drills, of which the following is a specification.

This invention relates to manure drills which are constructed so that they can be used for strewing long stable manure. The prongs which grip the manure only attack the manure when they are moved in forward direction while on their return motion they yield and the manure which they have carried along is retained by the grate bars at the bottom of the box or hopper.

The improved manure drills are constructed so that the curling of the manure around the prongs is prevented and consequently the choking up of the apparatus is avoided.

In the accompanying drawings the improved manure drill is shown.

Figure 1:
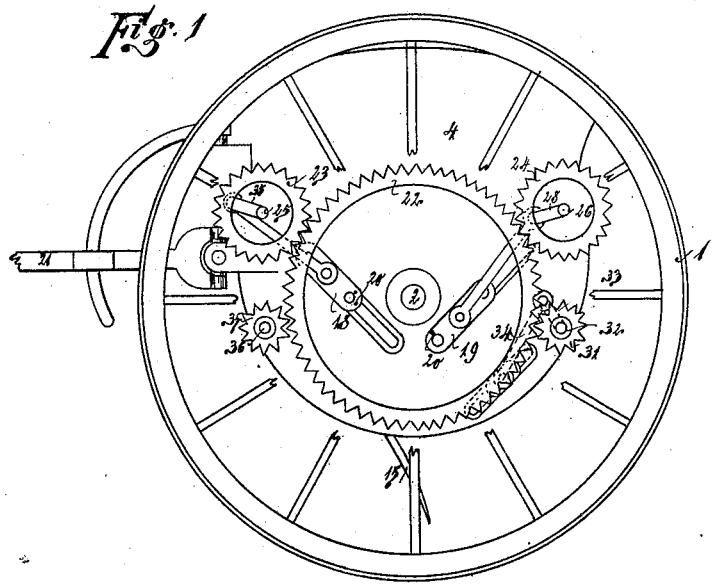
Figure 2:
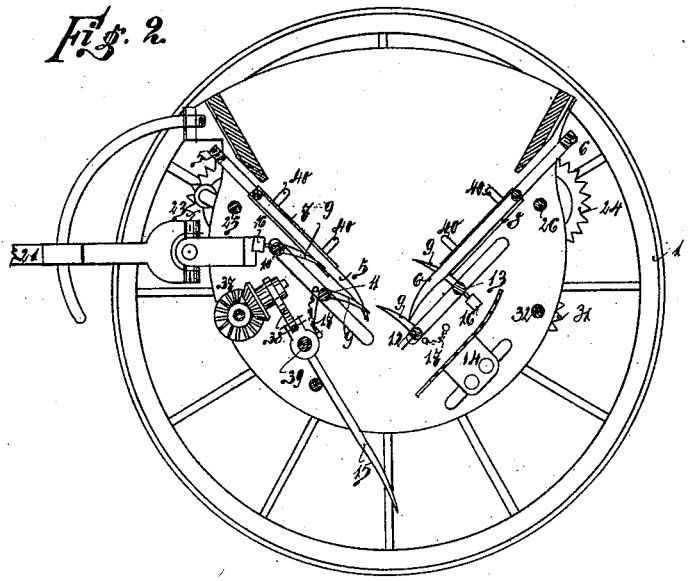

Figure 1 represents the manure drill in side view, Fig. 2 is a transverse section of Fig. 1 and Fig. 3 a ground plan view of the same.

An oblong box 3 mounted upon the axle 2 of the wheels 1 has its bottom composed of two grates 5, 6 which are inclined toward the middle of the box bottom and adjustably mounted in grooves 7, 8 of the end walls of said box. Owing to the adjustable arrangement of said grates the width of the slot between the inner ends of the grates can be regulated according to requirement. Below each of said grates 5, 6 two shafts 10, 11 and 12, 13 respectively are mounted which carry the prongs 9. These shafts receive alternatingly a reciprocating motion which is communicated to them in the manner which will be hereinafter described, whereby the manure is pushed by said prongs 9 through the slot between the grates 5, 6. The manure which falls out of the slot between the grates 5, 6 drops upon a shaking plate 14 which throws it upon the prongs 15 which are arranged opposite said shaking plate and which are animated by a continuous reciprocating motion. The prongs 9 are mounted on their shafts 10, 11, 12, 13 in such a manner that when said shafts return to their original position the prongs pivot so that they do not grip the manure but strip the manure adhering to them off at the bars of the grates 5, 6. The prongs can be brought into operative position when the shafts are moving downward, either by means of counterweights 16 or by means of levers or chains 17, springs or any other suitable devices. The upper surfaces of the grate bars as well as of the prongs 9 are provided with cutting edges so as to cut the manure. The revolving motion of the shafts 10, 11, 12, 13 for the prongs 9 is limited by the length of the slots which are arranged in the connecting pieces 18, 19 of said shafts, with which slots engage the studs 20 of said shafts.

All the parts of the manure drill are operated from the wheels 1 which by means of toothed coupling disks adapted to be thrown in or out of gear, revolve a toothed wheel 22, the revolving motion of said toothed wheels being transmitted by the cog wheels 23, 24 to the shafts 25, 26. Said shafts carry cranks 27, 28 which are connected by means of connecting rods 29, 30 with the guide pieces 18, 19 of the prong shafts 10, 11, 12, 13, which thus receive a continuous reciprocating motion. The shaking plate 14 is operated in a similar manner by means of the cam 31 of a shaft 32, cam 33 and connecting rod 34. Cog wheels 35 drive a shaft 36 which by means of the bevel gear 37 and the cam 38 communicates a laterally reciprocating motion to the prongs 15, mounted upon a shaft 39. The guide pieces 7, 8 in which the bottom grates 5, 6 are mounted, are fixed at the end walls 4 of the box in slots 40 which permit to vary the point of attack of the prongs 9 and consequently to regulate exactly the quantity of manure to be dealt out.

The manure drill is attached by means of the bars 21 behind the manure wagon so that the manure can be easily transferred from said car into the box 3 of the drill. The manure drill could further be used independently of the manure wagon in which case a pole has to be provided and the box 3 has preferably to be made higher.

I claim:—

An improved manure drill comprising in combination with the wheels and the axle of said wheels, a box which is open at the top and bottom, two grates downwardly inclined toward the middle of the bottom of the box so that a slot is left between their inner ends, means for adjusting the position of said grates in the end walls of the box in order to regulate the width of said slot, a pair of shafts fixed in connecting pieces and mounted below said grates, prongs mounted on said shafts so that they penetrate between the bars of the bottom grates when said shafts are moved toward the slot and means for returning said prongs which go back during the upward motion of said shafts, to the original position, a shaking plate under the rear grate destined to receive the manure which falls out of the slot and prongs animated by a lateral reciprocating motion destined to receive the manure thrown by said shaking plate to throw the same on the ground and means for transmitting motion to the various parts of the machine from the wheels which carry the main axle, substantially as described and shown and for the purpose set forth.

In witness whereof I have hereunto set my hand in the presence of two witnesses.

KARL BECKMANN.

Witnesses:
 ERNEST H. L. MUMMENHOFF,
 OTTO SCHULTZ.